April 16, 1963     E. P. ANDERSON     3,085,402
RE-IGNITER
Filed Sept. 23, 1958
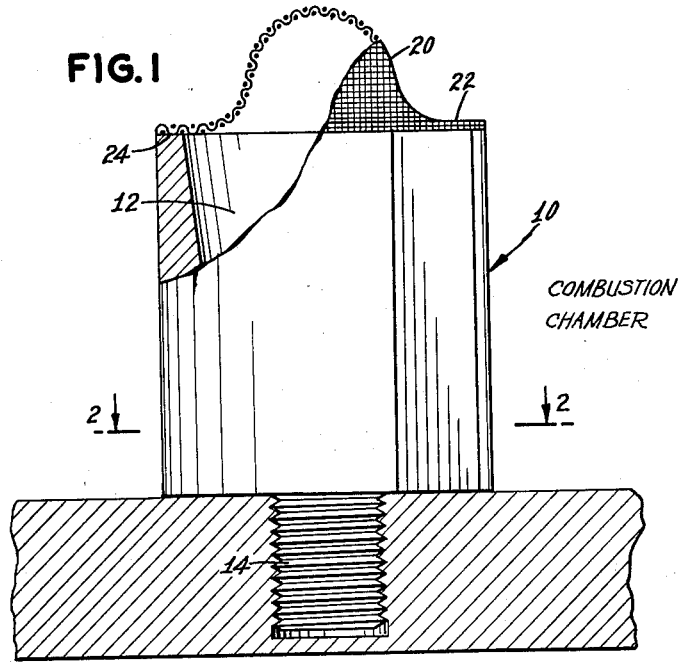
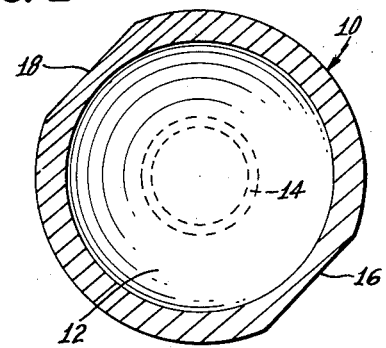
INVENTOR.
EDWARD P. ANDERSON
BY *Karl Huber*
*James E. Bryan*
ATTORNEYS

United States Patent Office 3,085,402
Patented Apr. 16, 1963

3,085,402
RE-IGNITER
Edward P. Anderson, Livingston, N.J., assignor, by mesne assignments, to Engelhard Industries, Inc., Newark, N.J., a corporation of Delaware
Filed Sept. 23, 1958, Ser. No. 762,726
2 Claims. (Cl. 60—39.82)

This invention relates to a re-igniter for internal combustion engines and, more particularly, is concerned with a re-igniter consisting essentially of a metallic support having a high heat capacity, and a structure of catalytically active precious metal mounted thereon, in order to facilitate the ignition of the fuel-air mixture in the combustion chamber of internal combustion engines.

In jet engines used in airplanes, it is of utmost importance to avoid or at least to shorten the periods of time customarily referred to as "flame-out." This condition exists when no ignition occurs and can result in serious difficulties and even accidents. Furthermore, the incomplete combustion resulting therefrom causes a loss of fuel and power delivered by the engine, since the mixture is exhausted without being utilized.

It has been suggested to place catalytically active precious metals or alloys thereof within the combustion chamber of internal combustion engines in order to promote re-ignition in the case of a so-called "flame-out" or to facilitate more complete combustion of the mixture when combustion of the fuel-air mixture is not complete at the prevailing pressure and temperature. An improved re-igniter for this purpose is obtained when mounting the precious metal surface, which is capable of catalytically promoting the ignition, in thermal proximity with a body having a high heat capacity, whereby the mass of the body substantially exceeds the mass of precious metal. The thermal mass then acts to accumulate the heat produced during normal operation of the engine and in case of a "flame-out" the catalytic mass is maintained at a high temperature for a sufficiently long period of time to re-ignite the fuel mixture. Re-igniters for internal combustion engines of the described type have been described in co-pending patent application, Serial No. 749,518, filed July 18, 1958, now abandoned, and the present invention constitutes a further development thereof.

It has been found that a re-igniter for internal combustion engines having improved ability to promote the ignition of a fuel-air mixture is provided by mounting a perforated structure of a precious metal, capable of catalytically promoting the ignition of the mixture, on a metallic support in such a manner that a hollow space is formed between the support at one side, and the structure at the other side, whereby the hollow space is entirely delimitated by the support and the structure. Advantageously, the catalytically active precious metal is used in the form of an expanded sheet, a wire screen, or the like. The fuel-air mixture, when passed into the combustion chamber contacts the perforated catalyst which remains at a high temperature during a flame-out and re-ignition will occur even under adverse conditions.

The invention will be further illustrated by reference to the accompanying drawing in which FIGURE 1 is a view in elevation of one embodiment of the invention, partly broken away, and FIGURE 2 is a cross section taken on the line 2—2 of FIGURE 1.

In accordance with the invention, the re-igniter consists of a metallic support 10 having the shape of a thick-walled cup to form a cavity 12 therein. The bottom of the cup is provided with a threaded stud 14 whereby the finished assembly may be secured within the combustion chamber of an engine. In order to facilitate the manipulation thereof, the support is provided with two flat surface portions 16 and 18.

The cavity 12 of the support is covered by a perforated structure 20 of precious, catalytically active metal having the shape of a bell and being mounted thereon so that the rim 22 of the bell is affixed to the edge 24 of the support 10, e.g. by brazing. The bell-shaped catalyst 20 is fabricated from a wire screen which lends itself especially well to be shaped into the desired form of a bell whereby wires of platinum or alloys thereof can be used. Good results have been obtained with an alloy consisting of 90 percent by weight of platinum and 10 percent by weight of rhodium.

When in use, and mounted within the combustion chamber of an engine by means of the stud 14 engaged within a cooperating tapped aperture in the wall of the chamber, the device will remain at the temperature prevailing in the chamber during normal operation of the engine. In the case of a flame-out, when no ignition takes place because the pressure-temperature conditions in the combustion chamber required for ignition are not fulfilled, the fuel-air mixture contained in the cavity 12 and enclosed between the walls of the cup-shaped support 10 and the bell-shaped catalyst 20 will be prevented from cooling by the heat retained in the comparatively thick walls of the support. Since this volume of fuel-air mixture is protected against the cooling action of inflowing gas and remains in contact with the catalytically active metal 20, re-ignition will take place primarily within the cavity 12 and from there, as a consequence, the entire contents of the combustion chamber will be re-ignited.

It will be obvious to those skilled in the art that many modifications may be made within the scope of the present invention without departing from the spirit thereof, and the invention includes all such modifications.

What is claimed is:

1. A re-igniter for internal combustion engines comprising a thick-walled, cup-shaped, imperforate metallic support, the outer, substantially cylindrical cup surface having flat portions to facilitate manipulation, said cup-shaped support having tapered inner side walls, the thickness of said walls increasing toward the bottom of the cup, a threaded bolt secured to the bottom of said cup-shaped support, and a bell-shaped screen formed of an alloy consisting essentially of 90 percent by weight of platinum and 10 percent by weight of rhodium having a circular rim continuously secured to the edge of said support in heat-conductive relationship with it to close the open end of said cup-shaped support, the bell-shaped screen area protruding outwardly from said support.

2. A re-igniter for internal combustion engines, which comprises a massive, imperforate metallic support of high heat-capacity having the shape of a thick-walled cup, a catalytically active, precious metal screen secured to the support along the entire length of the cup edge and in heat-conductive relationship with said cup edge and bulging outwardly thereof to form a hollow space entirely and solely delimited by the cup and the screen, and means for mounting the cup within the combustion chamber of said engine.

References Cited in the file of this patent

UNITED STATES PATENTS

| | | |
|---|---|---|
| 727,158 | Lang | May 5, 1903 |
| 1,015,411 | Webb | Jan. 23, 1912 |
| 1,284,842 | Weiss | Nov. 12, 1918 |
| 1,376,057 | Warner | Apr. 26, 1921 |
| 1,826,788 | Huber | Oct. 13, 1931 |
| 2,487,753 | Cohn | Nov. 8, 1949 |
| 2,489,620 | Cartwright | Nov. 29, 1949 |
| 2,648,951 | McDougal | Aug. 18, 1953 |
| 2,855,770 | Grube | Oct. 14, 1958 |
| 2,970,439 | Berl | Feb. 7, 1961 |

FOREIGN PATENTS

| | | |
|---|---|---|
| 213,207 | Australia | Feb. 24, 1958 |
| 1,095,865 | France | Dec. 29, 1954 |
| 696,756 | Great Britain | Sept. 9, 1953 |
| 221,734 | Switzerland | Sept. 1, 1942 |